United States Patent [19]

Asao et al.

[11] 4,098,114
[45] Jul. 4, 1978

[54] RECORDING SHEET

[75] Inventors: Yasuzi Asao; Yasuhiro Ogata; Noriyuki Hosoi, all of Fujimiya, Japan

[73] Assignee: Fuji Photo Film Co., Ltd., Minami-ashigara, Japan

[21] Appl. No.: 781,801

[22] Filed: Mar. 28, 1977

[30] Foreign Application Priority Data

Mar. 26, 1976 [JP] Japan ................... 51-33164

[51] Int. Cl.$^2$ .................. B41M 5/16; G01L 1/00
[52] U.S. Cl. ................... 73/141 R; 116/DIG. 34; 282/27.5; 427/150; 427/151; 427/152; 427/258; 428/307; 428/320; 428/322; 428/323; 428/914
[58] Field of Search .............. 282/27.5; 427/146, 150, 427/151, 153, 8, 152, 258, 261, 288; 428/323, 327, 411, 537, 913, 914, 307, 318, 320, 322, 402, 403, 407, 500, 513, 332, 334–336, 339; 116/DIG. 34; 73/88 R, 141 R

[56] References Cited

U.S. PATENT DOCUMENTS

| | | | |
|---|---|---|---|
| 2,929,736 | 3/1960 | Miller et al. | 282/27.5 |
| 3,469,439 | 10/1969 | Roberts et al. | 260/40 R |
| 3,647,504 | 3/1972 | Hayes et al. | 428/914 |
| 3,906,123 | 9/1975 | Vincent et al. | 427/145 |
| 4,003,245 | 1/1977 | Ogata et al. | 73/88 R |

*Primary Examiner*—George F. Lesmes
*Assistant Examiner*—Bruce H. Hess
*Attorney, Agent, or Firm*—Sughrue, Rothwell, Mion, Zinn and Macpeak

[57] ABSTRACT

A recording sheet, especially useful for measuring pressures of 1 to 2,000 kg/cm$^2$ with a high degree of accuracy, comprising a support, a recording layer thereon, and a protective layer of a transparent synthetic resin provided on top of the recording layer by extrusion coating, the recording layer containing microcapsules having a δ/D ratio (as defined in the specification hereof) of about $1.5 \times 10^{-3}$ to about $2.5 \times 10^{-1}$.

17 Claims, No Drawings

RECORDING SHEET

BACKGROUND OF THE INVENTION

1. FIELD OF THE INVENTION

This invention relates to a recording sheet. More specifically, the invention relates to a recording sheet comprising a coating of microcapsules having a volume average particle diameter and a number average wall thickness in a specified relationship, and a melt-extruded protective layer thereon.

2. DESCRIPTION OF THE PRIOR ART

A pressure-sensitive recording sheet is known as a typical example of a recording sheet comprising a support and coatings of a color former and a color developer. A pressure-sensitive recording sheet is composed of a support and coatings of a color former and a color developer. When microcapsules containing the color former are ruptured by pressures such as writing pressures, the color former chemically reacts with the color developer to form a recorded image.

Pressure-sensitive recording sheets of this kind have various defects since the coated layer on the support makes direct contact with the ambient atmosphere. For example, when they are stored in a place having a high humidity, or when water or oil adheres to them, a color reaction takes place to cause "color fog", and the characteristics of the product are impaired. Furthermore, they are susceptible to soiling by ink or dirt, etc., during use or storage, and are difficult to handle in storage. Moreover, the images recorded discolor with time, and this markedly impairs the commercial value of recording sheets.

In an attempt to eliminate such a defect, research and development work has been extensively done heretofore in regard to materials for the color former, the microcapsules, and the color developer. But so far a recording sheet has not yet been developed which has satisfactory resistance to moisture, water, oils, stain, light, and to abrasion.

A recording sheet comprising a support, a coating (recording layer) of a color former and a color developer, an adhesive layer and a transparent film, in this order, has also been known. This recording sheet has eliminated the aforementioned disadvantage, but still has the following disadvantages. Application of pressures is required in order to bond the recording layer and the transparent film. This results in the formation of "color fog" in the recording layer. Furthermore, this recording sheet has the disadvantage that the adhesive layer must be provided between the recording layer and the transparent film using a solvent. Since the adhesive layer during use contains the solvent remaining therein, difficulties such as a formation of "color fog" in the recording layer, a degradation of the working environment, or a restriction of the speed of producing the recording sheets, cannot be avoided.

It has been suggested on the other hand to measure planar or linear pressures using such recording sheets. But this method has the following disadvantages.

1. A linear relationship is not observed between the pressure applied and the density of a color formed.

2. "Color fog" ascribable to staining of the site of the pressure measurement tends to occur.

3. The density of color has poor stability with time. In other words, the accuracy of measurement is poor.

SUMMARY OF THE INVENTION

Investigations have now been made in order to overcome these disadvantages, and these investigations finally led to the accomplishment of the present invention.

A first object of this invention, therefore, is to provide a recording sheet free of color fog.

A second object of the invention is to provide a recording sheet having superior resistance to moisture, water, oils, staining, light and abrasion.

A third object of the invention is to provide a recording sheet which has a low cost and is simple to handle.

A fourth object of the invention is to provide a method for measuring pressures such as planar or linear pressures with a simple dynamic method.

A fifth object of the invention is to provide a recording sheet capable of obtaining measured values of high precision in the measurement of pressures such as planar or linear pressures within a range of 1 to 2,000 kg/cm$^2$.

A sixth object of the invention is to provide a recording sheet by which not only pressures at points but also the distribution of pressures such as planar or linear pressures can be measured with simplicity.

A seventh object of the invention is to provide a recording sheet in which a pattern of the distribution of pressures measured can be stored as such for a long period of time.

An eighth object of the invention is to provide a recording sheet which does not stain the hands or clothing, and where coloration on the hands or clothing occurs, only slightly.

The above objects of the invention are achieved by using microcapsules having a $\delta/D$ ratio, wherein D is the volume average particle diameter of the microcapsules, and $\delta$ is the number average wall thickness of the microcapsules, of about $1.5 \times 10^{-3}$ to about $2.5 \times 10^{-1}$ as a recording layer containing a color former and a color developer on a support, and melt-extruding a protective layer to shield the recording layer from the ambient atmosphere.

DETAILED DESCRIPTION OF THE INVENTION

When in the present invention, the ratio of the number average wall thickness ($\delta$) to the volume average particle diameter (D) of the microcapsules ($\delta/D$) is adjusted to a range of about $1.5 \times 10^{-3}$ to about $3.0 \times 10^{-2}$, preferably $2.0 \times 10^{-3}$ to $2.5 \times 10^{-2}$, especially preferably $2.5 \times 10^{-3}$ to $1.5 \times 10^{-2}$, a linear relationship between the pressure applied and the density of color formed is established at a pressure of less than about 300 kg/cm$^2$. Furthermore, when the ratio of the number average wall thickness ($\delta$) to the volume average particle diameter (D) of the microcapsules is adjusted to a range of about $4 \times 10^2$ to about $2.5 \times 10^{-1}$, preferably $4 \times 10^{-2}$ to $1 \times 10^{-1}$, especially preferably $4.5 \times 10^{-2}$ to $8 \times 10^{-2}$, a linear relationship between the pressure applied and the density of color formed is established over a pressure range of about 400 to about 2,000 kg/cm$^2$.

If the $\delta/D$ ratio of the microcapsules exceeds the upper limit specified in this invention, the increase in color density according to color formation at high pressures is small, and the accuracy of measurement is reduced. If the ratio is lower than the lower limit specified in the present invention, it is difficult to detect an increase in density according to changes in pressure. To obtain the δ/D range set forth above, the volume average particle diameter of the microcapsules can be adjusted by controlling the stirring rate and/or time during the emulsification of the color formers in forming the microcapsules, or the number average wall thickness of the microcapsules can be adjusted by controlling the amount of wall-forming materials for the microcapsules in their preparation, with either approach thereby rendering a δ/D ratio within the range set forth above achievable.

The protective layer in the recording sheet of this invention is formed by a melt-extrusion method. The melt-extrusion method, as is well known in the resin art, denotes a method whereby a molten resin is coated on the recording layer to form a film thereon. Synthetic resins which can be used to form the protective layer are those which are impermeable to liquids and can be molded by melt-extrusion include polyolefins such as polyethylene or polypropylene, ethylene-type copolymers such as an ethylene/vinyl acetate copolymer or an ethylene/acrylic acid copolymer, propylene-type copolymers, polyvinyl chloride, polyamides, polycarbonates, nylons, ionomers, mixtures of these resins, and multilayered structures of these resins. Of these, polyolefins such as polyethylene are especially preferred. Although there is no limitation on the properties, such as molecular weight, of the resin, the resins used in this invention must be melt-extrudable, generally at temperatures ranging from about 200° to about 350° C. The extruding temperature of the resin is above the melting point of the resin and preferably is a temperature at which the viscosity of the molten resin is stable. Such a temperature range is well known in the synthetic resin field, and for example, the extruding temperature for polyethylene is about 250° to about 320° C.

It is known that recording sheets based on a combination of a color former and a color developer can be used not only for pressure-sensitive recording but also for thermo-sensitive recording. Accordingly, there is likelihood that "color fog" due to heat may occur when such a high temperature resin is melt-extruded onto the surface of the resin layer. However, it has now been unexpectedly found that there was no formation of such "color fog".

A suitable thickness of the protective layer is about 1 to about 400 microns, preferably about 5 to 300 microns. The speed of coating the protective layer is about 5 to 500 meters/min., preferably about 10 to 400 meters/min., most preferably about 50 to 200 meters/min. At such a coating speed, a smooth coated surface can be obtained.

The recording layer in the present invention denotes a layer containing a color former and a color developer. Thus, the definition of the recording layer includes a single layer containing both the color former and the color developer, and a layer composed of a color developer-containing layer and a color former-containing layer.

Microencapuslating methods that can be utilized to produce the recording sheet of this invention include a coacervation method (disclosed, for example, in U.S. Pat. Nos. 2,800,457, 2,800,458, 3,041,289 and 3,687,865), an interfacial polymerization method (disclosed, for example, in U.S. Pat. Nos. 3,492,380 and 3,577,515, and British Pat. Nos. 950,433, 1,046,469 and 1,091,141), an internal polymerization method (disclosed, for example, in British Pat. Nos. 1,237,498, and French Pat. Nos. 2,060,818 and 2,090,862), and an external polymerization method (disclosed, for example, in British Pat. No. 989,264, and Japanese Patent Publication Nos. 12380/62, 14327/62, 29483/70, 7313/71, and 30282/71).

The "color former", as used in the present specification and the appended claims, denotes a colorless compound which forms a color upon contact with a solid acid, and can be defined also as a substantially colorless electron-donating organic compound.

The type and properties of the color former do not substantially affect the present invention, and therefore, various kinds of color formers can be used, for example, triarylmethane-type compounds, diarylmethane-type compounds, xanthene-type compounds, thiazine-type compounds, and spiropyran-type compounds. Examples of suitable color formers which can be used are described in U.S. Pat. Nos. 2,548,365, 2,548,366, 3,293,060, 3,501,331, 3,506,471, 3,514,310, 3,551,181, 3,631,064, 3,663,571, 3,681,392, 3,836,383, 3,697,540, 3,963,553, etc.

Specific examples of the color formers are triphenylmethane-type compounds such as 3,3-bis(p-dimethylaminophenyl)-6-dimethylaminophthalide (i.e., crystal violet lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl) phthalide, 3-(p-dimethylaminophenyl)-3-(2-phenylindol-3-yl)phthalide, 3,3-bis(1,2-dimethylindol-3-yl)-5-dimethylaminophthalide, 3,3-bis(1,2-dimethylindol-3-yl)-6-dimethylaminophthalide, 3,3-bis(9-ethylcarbazol-3-yl)-5-dimethylaminophthalide, 3,3-bis(2-phenylindol-3-yl)dimethylaminophthalide, and 3-p-dimethylaminophenyl-3-(1-methylpyrrol-2-yl)-6-dimethylaminophthalide; diphenylmethane-type compounds such as 4,4'-bis-dimethylaminobenzohydrin benzyl ether, N-halophenyl leuco auramines, and N-2,4,5-trichlorophenyl leuco auramines; xanthene compounds such as rhodamine-B-anilinolactam, rhodamine-(p-nitroanilino)lactam, rhodamine-B-(p-chloroanilino)-lactam, 7-dimethylamino-2-methoxyfluoran, 7-diethylamino-3-chloro-2-methylfluoran, 7-diethylamino-3-(acetylmethylamino)fluoran, 7-diethylamino-3-(dibenzylamino)fluoran, 7-diethylamino-3-(methylbenzylamino)fluoran, 7-diethylamino-3-(chloroethylmethylamino)fluoran and 7-diethylamino-3-(diethylamino)fluoran; thiazine compounds such as benzoyl leucomethylene blue, and p-nitrobenzyl leucomethylene blue; and spiro compounds such as 3-methyl-spirodinaphthopyran, 3-ethyl-spiro-dinaphthopyran, 3,3'-dichloro-spiro-dinaphthopyran, 3-benzyl-spiro-dinaphthopyran, 3-methyl-naphtho-(3-methoxy-benzo)spiropyran, and 3-propyl-spiro-dibenzopyran.

These color former compounds can be used either individually or as a mixture of two or more. In the case of microcapsules generally used in the form where the color former is dissolved therein, there is no restriction in the present invention as to the solvent which can be used to dissolve the color former, and all solvents heretofore known can be used. Examples include aromatic synthetic oils such as alkylnaphthalenes, alkylbiphenyls, hydrogenated terphenyl and alkylated diphenylmethane (the alkyl groups in these compounds contain about 1 to 5 carbon atoms, and the number of the alkyl groups is 1 to 4), petroleum fractions such as kerosene, naphtha or paraffin oil, synthetic aliphatic oils such as chlorinated paraffin, vegetable oils such as cotton seed oil, soybean oil and linseed oil, and mixtures of these oils. The concentration of the color former in the solution is not particularly limited.

Thus, a microcapsule coating liquid can be obtained. Desirably, the microcapsules are mononuclear, but microcapsules of a polynuclear structure can also be used in this invention.

The size of the microcapsule generally produced is about 0.1 to 100 microns, preferably about 0.5 to 50 microns, and microcapsules of these sizes can be used in this invention.

Since the microcapsule coating liquid is usually a dispersion of the capsules, it can be directly coated on a support. If desired, with or without separation of the microcapsules from the microcapsule dispersion, a binder may be incorporated in the dispersion. Examples of suitable binders are latexes such as a styrene/butadiene rubber latex, and a water-soluble polymeric material such as starch, carboxymethyl cellulose, polyvinyl alcohol, gum arabic, casein, and gelatin. The microcapsule coating liquid or the microcapsular layer may contain a capsule-reinforcing agent such as fine powders of cellulose (e.g., as disclosed in U.S. Pat. No. 2,711,375), a fine powder of a polymer (e.g., as disclosed in U.S. Pat. No. 3,625,736), a fine powder of starch (e.g., as disclosed in British Pat. No. 1,232,347), and microcapsules which do not contain any color former (e.g., as disclosed in British Pat. No. 1,235,991). Preferably, the capsule-reinforcing agent is not present as a layer, but dispersed in the capsule layer or on the surface of the capsule layer.

The coating amount of the capsule coating liquid which can be used is about 0.5 to 17 g/m$^2$, especially about 2 to 6 g/m$^2$.

The term "color developer", as used in the present specification and the appended claims, denotes a solid acid, more specifically an electron-accepting solid acid. Color developers are described in the patents cited hereinabove. Specific examples of color developers which can be used are clays such as acid clay, activated clay or attapulgite; organic acids such as aromatic carboxyl compounds (e.g., salicylic acid), aromatic hydroxy compounds (e.g., p-t-butylphenol, p-t-amylphenol, o-chlorophenol, m-chlorophenol or p-chlorophenol, and metal salts, for example, zinc salts, of these compounds; mixtures of organic acids (e.g., salicylic acid) and metal compounds (e.g., zinc oxide); and acid polymers such as a phenol/formaldehyde resin or a phenol/acetylene resin. Color developers are also described, for example, in U.S. Pat. Nos. 2,972,547, 3,427,180, 3,455,721, 3,501,331, 3,516,845, 3,554,781, 3,619,238, 3,622,364, 3,625,736, 3,634,121, 3,672,935, 3,669,711, 3,732,120, 3,753,761, 3,772,052, 3,856,553, 3,864,146, 3,864,299, 3,874,895, 3,924,027, 3,983,292, etc.

The color developer may be coated on a support together with a binder. Examples of suitable binders include latexes such as a styrene/butadiene latex or a styrene/butadiene/acrylonitrile latex; water-soluble natural polymeric compounds such as proteins (e.g., gelatin, gum arabic, albumin or casein), celluloses (e.g., carboxymethyl cellulose or hydroxyethyl cellulose), and polysaccharides (e.g., agar, sodium alginate, starch or carboxymethyl starch); water-soluble synthetic polymeric compounds such as polyvinyl alcohol, polyvinyl pyrrolidone, polyarylic acid or polyacrylamide; and organic solvent-soluble polymeric compounds such as nitrocellulose, ethyl cellulose, polyesters, polyvinyl acetate, polyvinylidene chloride or a vinyl chloride/vinylidene chloride copolymer. These binder compounds can also be used as binders for the microcapsule dispersion. The color developer layer may contain known additives, if desired. A suitable amount of the color developer generally coated ranges from about 0.5 to about 10 g/m$^2$.

Suitable materials which can be used for the support include polyethylene, polypropylene, polyethylene terephthalate, polystyrene, nylons, polycarbonate, polyvinyl chloride, polysulfone, polyimides, polytetrafluoroethylene, poly(methyl methacrylate), polyvinyl alcohol, ionomers, cellulose triacetate, cellophane, an ethylene-type copolymer (e.g., an ethylene/acrylic acid copolymer, an ethylene/sodium acrylate copolymer, an ethylene/acrylic acid/sodium acrylate copolymer, an ethylene/zinc acrylate copolymer an ethylene/methacrylic acid copolymer, an ethylene/sodium methacrylate copolymer, an ethylene/methacrylic acid/sodium methacrylate copolymer, an ethylene/vinylsulfonic acid copolymer, and an ethylene/vinyl acetate copolymer), a propylene-type copolymer, a vinyl chloride-type copolymer, a styrene-type copolymer, and blends of these polymers. Paper and natural polymeric materials such as gelatin can also be used. Paper supports may be those derived from a synthetic pulp such as polyethylene or polypropylene or a mixture of a synthetic pulp and a wood pulp.

A metal foil such as aluminum, copper or iron, and an inorganic material such as glass fibers can also be utilized. A metal foil is effective particularly when the site of pressure measurement has a high temperature. Furthermore, laminates of synthetic plastics, natural polymeric materials, metal foils, and inorganic materials, such as a structure obtained by laminating a synthetic resin to one or both surfaces of paper, or a structure obtained by laminating a synthetic resin to one or both surfaces of a metal foil, can be utilized. Those having one laminated plastic layer are especially useful.

If desired, the adhesion strength between the surface of the support and the coated layer may be increased using various surface-activating methods, for example, by a physical method such as a corona discharge, a glow discharge or a flame treatment, or by a chemical method such as the coating of an anchoring agent or a primer, or a combination of these methods.

A most convenient thickness of the support is about 10 to about 500 microns. The surface of the support may be smooth, or have regular or irregular depressed and raised portions.

According to the melt-extruding method used in this invention, a smooth coated surface can be obtained at an extrusion speed of about 10 meters/min. to about 400 meters/min., particularly about 50 meters/min. to about 200 meters/min.

The recording sheet in accordance with this invention has superior resistance to moisture, water, oils, staining, discoloration, and abrasion. No "color fog" occurs during its production, and the overall process can be performed within a shorter period of time.

The characteristics required of the recording sheet of this invention as a pressure measuring sheet are that (1) within the range of pressures to be measured, there should be a certain correlation (for example, directly proportional or inversely proportional) between pressures applied and changes in the optical density or in the color images formed by contact pressures, and (2) in the correlation mentioned previously, the error in measurement should be small, and the accuracy of measurement should be high.

A series of investigations on the second requirement have now been conducted and it has been found that the use of microcapsules having a $\delta/D$ ratio, where $\delta$ is the number average wall thickness in microns of the microcapsules, and D is the volume average particle diameter in microns of the microcapsules, of about $1.5 \times 10^{-3}$ to about $2.5 \times 10^{-1}$ can give a pressure measuring sheet which has a small measurement error and a markedly high precision in the measurement of pressures such as planar or linear pressures within the range of about 1 to about 2,000 kg/cm$^2$.

It has been found that when microcapsules having a $\delta/D$ ratio of about $4 \times 10^{-2}$ to about $2.5 \times 10^{-1}$, especially $4.5 \times 10^{-2}$ to $8 \times 10^{-2}$, are used, a pressure measuring sheet can be obtained which has a small measurement error and a markedly high precision in measurement of pressures within the range of about 400 to 2,000 kg/cm$^2$.

The method of pressure measurement in accordance with this invention is performed as follows: First, the recording sheet is held at the site of pressure measurement, and a pressure is applied to the sheet. The recording sheet forms a color depending on the degree of pressure applied. Then, changes in the optical density or in the color of the colored image are read, and the pressures applied are also read. The pressures applied can be read from a separately determined correlation between the density or color and known pressures applied.

In the present application, the volume average particle diameter (D) of the microcapsules, and the number average wall thickness ($\delta$) of the microcapsules were measured using the following methods.

(A) Method of Measuring the Volume Average Particle Diameter of Microcapsules:

The capsule liquid is placed in about 100 ml of a 1% aqueous solution of sodium chloride to a concentration of 10 to 100 ppm, and the mixture is stirred. The particle diameters of the microcapsules are measured by a customary method using a universal particle size distribution measuring apparatus (Coulter Counter Model TA, a product of Coulter Electronics Inc., Hialeah, Fla., U.S.A.), and the volume average particle diameter D (microns) is calculated.

(B) Method of Measuring the Number Average Wall Thickness of Microcapsules:

The microcapsule liquid is coated on a surface-treated polyethylene terephthalate film base, and an epoxy resin is included in the layer in order to fix the microcapsules. The coating is allowed to solidify by standing for one day at 60° C. Using an ultramicrotome (Model MT-I of Porterblum (trade name, manufactured by Ivansorvall Co.)), the resulting structure is sliced so as to cut the microcapsules exactly in half. The resulting ultrathin pieces are photographed by using a transmission-type electron microscope (Model HU-12A, a product of Hitachi Limited) at a magnification of about 10,000 to 50,000X and an acceleration voltage of 100 kilovolts on a film (Fuji Electronmicrograph FG Film, a product of the Fuji Photo Film Co., Ltd.). The thicknesses are measured from the photograph, and an average of the film thickness ($\delta$ in microns) is calculated.

The following examples illustrate in detail the recording sheets of this invention and the practical utility of pressure measuring methods utilizing the recording sheets. It is to be noted that these examples are not in any way to be construed as limiting the scope of the invention. Unless otherwise indicated herein, all parts, percents, ratios and the like are by weight.

EXAMPLE 1

Rhodamine B lactam (3 parts) and 3 parts of 3-diethylamino-7-methylfluoran were dissolved in 35 parts of alkylated diphenylmethane, and 1 part of an adduct of tolylene diisocyanate with trimethyl propane, 0.5 part of an adduct of hexamethylene diisocyanate with trimethylol propane and 0.2 part of an adduct of ethylene diamine with propylene oxide were dissolved in the solution. The resulting solution was emulsified and dispersed in a solution of 2 parts of carboxymethyl cellulose and 2 parts of polyvinyl alcohol in 40 parts of water. The temperature at the time of dispersion was set at 20° C. After dispersion, 150 parts of water was added, and with stirring, the dispersion was heated to 70° C. The temperature of the dispersion was then adjusted to 30° C, and 5 parts of cellulose floc and 10 parts of oxidized starch were added to obtain a microcapsule coating liquid having a $\delta/D$ ratio of $5.2 \times 10^{-2}$.

The resulting microcapsule coating liquid was coated on a paper support at a rate of 5 g/m$^2$ using an air knife coater, and dried to form a color former sheet.

On the other hand, 50 parts of a p-phenylphenol/formaldehyde resin, 100 parts of butyl acetate and 100 parts of toluene were kneaded in a ball mill for 24 hours to form a color developer coating solution. The resulting coating solution was coated on the color former sheet at a rate of 6 g/m$^2$, and dried.

Low-density polyethylene (Sumikathene L-211, a product of Sumitomo Chemical Co., Ltd.) was melted and extrusion-coated on the resulting recording layer in a thickness of 0.03 mm at an extrusion temperature of 270° C to form a protective layer. The melt extrusion-coating machine used included a 60 mm-diameter screw extruder and a T-die with a width of 500 mm, and the rate of take up at the time of coating was 30 meters/min. The surface of a cooling roll on which to cast the resin had been matte-finished.

Since the recording layer firmly adhered to the protecting layer in the resulting recording sheet, peeling of the protecting layer resulted in the rupture of the entire surface of the recording layer.

No "color fog" occurred due to heat at the time of the melt extrusion coating.

When water droplets, oil droplets (for example, droplets of toluene or grease) or ink was dropped on the recording sheet, no "fog" was observed on the recording layer. In addition, this recording sheet had good abrasion resistance.

The density of the color formed by pressure on this recording sheet was equivalent to that on a recording sheet of the same structure without a protective layer. Thus, sufficient feasible quality as a pressure-sensitive recording sheet was retained.

In order to measure the pressure distribution and pressures at the clamping part of a valve flange, the resulting recording sheet was placed on the clamping portion of the flange, and a pressure was applied to the sheet to form a color.

Separately, recording sheets of the same kind were subjected to pressures varying at intervals of 5 kg/cm$^2$ to form colors, and comparative samples for pressure determination were prepared.

The recording sheet placed at the clamping portion of the flange was removed, and compared with the comparative samples. From the density of the color, the clamping pressure of the clamping part of the flange, and the pressure distribution could be measured.

EXAMPLE 2

The back of a paper having a basis weight of 60 g/m² and a thickness of 70 microns was coated with low-density polyethylene (Sumikathene L-211, a product of Sumitomo Chemical Co., Ltd.) in a thickness of 0.03 mm. The surface of the resulting support was coated with low-density polyethylene (Sumikathene L-211) containing 5 parts of titanium oxide in a thickness of 0.03 mm. The coated surface was treated with corona discharge, and coated with a styrene/butadiene latex at a rate of 2 g/m².

Rhodamine B lactam (3 parts) and 3 parts of 3-diethylamino-7-methylfluoran were dissolved in 35 parts of alkylated diphenylmethane, and then 10 parts of an adduct of tolylene diisocyanate with trimethylol propane, 10 parts of an adduct of hexamethylene diisocyanate with trimethylol propane and 0.2 part of an adduct of ethylene diamine with propylene oxide were dissolved in the solution. The resulting solution was emulsified and dispersed in a solution of 2 parts of carboxymethyl cellulose and 2 parts of polyvinyl alcohol in 40 parts of water. The temperature at the time of emulsification was set at 20° C. After emulsification, 150 parts of water was added, and with stirring, the mixture was heated to 70° C. The temperature of the mixture was adjusted to 30° C, and 5 parts of cellulose floc and 10 parts of oxidized starch were added to form a microcapsule coating liquid having a $\delta/D$ ratio of $8.7 \times 10^{-2}$.

The microcapsule coating liquid so obtained was coated on the styrene/butadiene latex layer of the support at a rate of 5 g/m² using an air knife coater, and dried to form a color former sheet.

Further, 50 parts of p-phenylphenol/formaldehyde resin, 100 parts of butyl acetate and 100 parts of toluene were kneaded for 24 hours in a ball mill to form a color developer coating solution. The coating solution was coated on the color former sheet at a rate of 6 g/m² to form a single-leaf pressure-measurable recording sheet.

The same resin as used to coat the back of the support in this Example was coated on the surface of the recording sheet obtained.

The resulting sheet was set between calender rolls of a paper machine in order to measure nip pressures between them, and a nip pressure was applied.

Separately, recording sheets of the same kind as prepared above were subjected to pressures of 600 to 2,000 kg/cm² at intervals of 200 kg/cm². The colored marks obtained were measured by a densitometer, and a calibration curve showing the relationship between the pressures and the color densities was prepared.

The recording sheet set between the rolls was removed and the colored image was measured using a densitometer. The pressure applied was read by examining the calibration curve. It was found that the color density was 0.45 and the pressure applied was about 1,050 kg/cm².

COMPARATIVE EXAMPLE

In the same manner as in Example 2, a microcapsule coating liquid having a $\delta/D$ ratio of $3.5 \times 10^{-2}$ was prepared, and a measuring sheet was prepared by coating the microcapsule liquid on a support and then the same color developer coating solution as in Example 2 on top of it. A calibration curve was prepared in the same way as in Example 2, and the nip pressure between calender rolls was measured by using the measuring sheet in the same way as in Example 2.

It was found that according to the method of this comparison, the error of measurement was large at pressures above 600 kg/cm², and the precision of measurement was very poor.

The relationships between the pressures and densities in the recording sheets of Example 2 and Comparative Example are shown in the following table.

| | Color Density | |
|---|---|---|
| Pressure Applied (kg/cm²) | Pressure-Measuring Sheet of Example 2 | Pressure-Measuring Sheet of the Comparative Example |
| 600 | 0.21 | 0.95 |
| 800 | 0.32 | 0.90 |
| 1,000 | 0.42 | 0.93 |
| 1,200 | 0.53 | 0.95 |
| 1,400 | 0.65 | 0.91 |
| 1,600 | 0.76 | 0.90 |
| 1,800 | 0.87 | 0.89 |
| 2,000 | 0.97 | 0.87 |

It can be seen from the results obtained that recording sheets produced by using microcapsules having the specified relationship exhibit small measuring errors and very high measurement accuracy in measuring pressures from 600 to 2,000 kg/cm².

When the resulting recording sheets are used for ordinary applications, no "color fog" occurs, and the sheets have superior resistance to water, oils, abrasion and staining. Furthermore, their color-formability under pressure was as good as that of recording sheets without a protective layer.

The recording sheets of this invention are especially useful for use in a method of measuring pressures in which the pressures are read from changes in the optical density or color of colored images obtained by applying pressures to the recording sheets.

While the invention has been described in detail and with reference to specific embodiments thereof, it will be apparent to one skilled in the art that various changes and modifications can be made therein without departing from the spirit and scope thereof.

What is claimed is:

1. A recording sheet comprising a support, a recording layer thereon containing a color former and a color developer, and a protective layer of a transparent synthetic resin provided on the recording layer by extrusion coating, said recording layer containing microcapsules having a $\delta/D$ ratio of about $1.5 \times 10^{-3}$ to about $2.5 \times 10^{-1}$, wherein $\delta$ is the number average wall thickness of the microcapsules and D is the volume average particle diameter of the microcapsules.

2. The recording sheet of claim 1, wherein the microcapsules have a $\delta/D$ ratio of $4 \times 10^{-2}$ to $2.5 \times 10^{-1}$.

3. The recording sheet of claim 1, wherein when the pressure to be measured is less than about 30 Kg/cm², $\delta/D$ is about $1.5 \times 10^{-3}$ to about $3.0 \times 10^{-2}$; and when the pressure to be measured is about 400 to about 2,000 Kg/cm², $\delta/D$ is about $4 \times 10^{-2}$ to about $2.5 \times 10^{-1}$.

4. The recording sheet of claim 1, wherein the microcapsules have a particle diameter of 0.1 to 100 microns.

5. The recording sheet of claim 1, wherein the transparent synthetic resin is a polyolefin.

6. The recording sheet of claim 1, wherein the protective layer has a thickness of about 5 to about 300 microns.

7. The recording sheet of claim 1, wherein said recording layer comprises a layer of a color former and a layer of a color developer.

8. The recording sheet of claim 1, in which the recording sheet is a pressure sensitive recording sheet.

9. The recording sheet of claim 8, in which said color former is contained in microcapsules.

10. The recording sheet of claim 1, wherein said extrusion is at about 200° to about 350° C.

11. The recording sheet of claim 1, wherein said protective layer is about 1 to about 400 microns thick.

12. The recording sheet of claim 1, wherein said protective layer is about 5 to about 300 microns thick.

13. The recording sheet of claim 1, wherein said recording layer is a single layer between said support and said protective layer.

14. The recording sheet of claim 1, wherein said recording layer is the combination of a color developer-containing layer and a color-former containing layer between said support and said protective layer.

15. In a method of pressure measurement wherein a recording sheet is maintained at the site of pressure measurement and the pressure to be measured is applied to said sheet to form color in accordance with the degree of pressure applied, and changes in optical density or in color of the resulting color are correlated with pressure to determine the pressure applied, the improvement wherein said recording sheet comprises a support, a recording layer thereon containing a color former and a color developer, and a protective layer of a transparent synthetic resin provided on the recording layer by extrusion coating, said recording layer containing microcapsules having a $\delta/D$ ratio of about $1.5 \times 10^{-3}$ to about $2.5 \times 0^{-1}$, wherein $\delta$ is the number average wall thickness of the microcapsules and D is the volume average particle diameter of the microcapsules.

16. A method of measuring pressure as called for in claim 15, wherein:

when the pressure to be measured is less than about 30 Kg/cm$^2$, $\delta/D$ is about $1.5 \times 10^{-3}$ to about $3.0 \times 10^{-2}$; and when the pressure to be measured is about 400 to about 2,000 Kg/cm$^2$, $\delta/D$ is about $4 \times 10^{-2}$ to about $2.5 \times 10^{-1}$.

17. In a method for manufacturing a recording sheet comprising a support, a recording layer thereon containing a color former and a color developer, the improvement wherein a protective layer of a transparent synthetic resin is provided on the recording layer by extrusion coating and further wherein said recording layer contains microcapsules having a $\delta/D$ ratio of about $1.5 \times 10^{-3}$ to about $2.5 \times 10^{-1}$, wherein $\delta$ is the number average wall thickness of the microcapsules and D is the volume average particle diameter of the microcapsules.

* * * * *